United States Patent
Wu et al.

(10) Patent No.: US 11,993,370 B2
(45) Date of Patent: May 28, 2024

(54) COAXIAL TILT-ROTOR UNMANNED AERIAL VEHICLE AND CONTROL METHOD THEREOF

(71) Applicant: DALIAN UNIVERSITY OF TECHNOLOGY, Liaoning (CN)

(72) Inventors: Yuhu Wu, Liaoning (CN); Zongyang Lv, Liaoning (CN); Ximing Sun, Liaoning (CN); Xiangyu Shen, Liaoning (CN); Rui Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 489 days.

(21) Appl. No.: 17/414,715

(22) PCT Filed: May 13, 2020

(86) PCT No.: PCT/CN2020/089944
§ 371 (c)(1),
(2) Date: Jun. 16, 2021

(87) PCT Pub. No.: WO2021/226857
PCT Pub. Date: Nov. 18, 2021

(65) Prior Publication Data
US 2022/0126995 A1   Apr. 28, 2022

(51) Int. Cl.
*B64C 29/00* (2006.01)
*B64C 11/48* (2006.01)
(Continued)

(52) U.S. Cl.
CPC .......... *B64C 29/0033* (2013.01); *B64C 11/48* (2013.01); *B64C 39/024* (2013.01);
(Continued)

(58) Field of Classification Search
CPC ... B64C 29/005; B64C 29/0033; B64C 11/48; B64U 10/10
(Continued)

(56) References Cited

U.S. PATENT DOCUMENTS 9,540,100 B2   1/2017   Dekel et al.
9,938,005 B2 *  4/2018   Matus .................. G05D 1/0808
(Continued)

FOREIGN PATENT DOCUMENTS

CA       3042109 A1 *  1/2020  ............. B64C 27/08
CN     101875399 A   * 11/2010
(Continued)

*Primary Examiner* — Christopher P Ellis
(74) *Attorney, Agent, or Firm* — Muncy, Geissler, Olds & Lowe, P.C.

(57) ABSTRACT

A coaxial tilt-rotor unmanned aerial vehicle (CTRUAV) and a control method thereof. The CTRUAV includes three rotor modules, five rotors with motors and a control system. The three rotor modules are in an inverted triangle layout. The left and right coaxial tiltable rotor modules in the front of the CTRUAV can rotate around the plane of a fuselage. A rear rotor is installed on the rear fixed-axis rotor module. Two pairs of coaxial rotors are respectively installed on the left and right coaxial tiltable rotor modules. The left and right coaxial tiltable rotor modules include an upper rotor and a lower rotor respectively; the upper rotor and the lower rotor have opposite rotation directions and the same rotation speed during the flight. In the two pairs of coaxial rotors, the rotors on the same layers have opposite rotation directions, and the rotors on different layers have the same rotation directions.

2 Claims, 5 Drawing Sheets

(51) Int. Cl.
  *B64C 39/02* (2023.01)
  *B64U 10/10* (2023.01)
  *B64U 10/25* (2023.01)
  *B64U 70/80* (2023.01)
(52) U.S. Cl.
  CPC .............. *B64U 10/10* (2023.01); *B64U 10/25* (2023.01); *B64U 70/80* (2023.01)
(58) Field of Classification Search
  USPC ........................................................ 244/12.4
  See application file for complete search history.

(56) References Cited

U.S. PATENT DOCUMENTS

| | | | | |
|---|---|---|---|---|
| 10,301,016 | B1* | 5/2019 | Bondarev | B64C 15/12 |
| 10,562,623 | B1* | 2/2020 | Sloan | B64C 25/10 |
| 10,766,627 | B2* | 9/2020 | Hehn | B64D 31/06 |
| 11,485,488 | B1* | 11/2022 | Armer | B64U 10/20 |
| 2010/0301168 | A1* | 12/2010 | Raposo | G05D 1/0858 |
| | | | | 244/171.2 |
| 2012/0091257 | A1* | 4/2012 | Wolff | B64U 10/20 |
| | | | | 244/12.4 |
| 2019/0135424 | A1* | 5/2019 | Baity | B64C 39/10 |
| 2019/0329882 | A1* | 10/2019 | Baity | B64C 27/26 |
| 2020/0172236 | A1* | 6/2020 | George | B64F 1/362 |

FOREIGN PATENT DOCUMENTS

| | | | | | |
|---|---|---|---|---|---|
| CN | 101875399 | A | | 11/2010 | |
| CN | 102632994 | A | | 8/2012 | |
| CN | 103832583 | A | * | 6/2014 | |
| CN | 103832583 | A | | 6/2014 | |
| CN | 102632994 | B | * | 7/2014 | |
| CN | 105775122 | A | | 7/2016 | |
| CN | 106800089 | A | | 6/2017 | |
| CN | 107140192 | A | * | 9/2017 | |
| CN | 107639984 | A | | 1/2018 | |
| CN | 107662702 | A | | 2/2018 | |
| CN | 107757897 | A | * | 3/2018 | |
| CN | 110122319 | A | * | 8/2019 | |
| CN | 110356550 | A | * | 10/2019 | ............ B64C 27/26 |
| CN | 110963028 | A | | 4/2020 | |
| CN | 113353252 | A | * | 9/2021 | |
| CN | 113650780 | A | * | 11/2021 | |
| CN | 218617171 | U | * | 3/2023 | |
| EP | 2690012 | A1 | * | 1/2014 | ............ B64C 27/26 |
| KR | 20180081923 | A | * | 2/2018 | |
| KR | 20190075770 | A | * | 12/2020 | |
| WO | WO-2017063088 | A1 | * | 4/2017 | ............ B64C 27/08 |
| WO | WO-2019210128 | A2 | * | 10/2019 | ............ B64C 27/08 |
| WO | WO-2020191489 | A1 | * | 10/2020 | |
| WO | WO-2021217425 | A1 | * | 11/2021 | ............ B64C 39/02 |
| WO | WO-2022125132 | A1 | * | 6/2022 | ............ B64C 27/08 |

* cited by examiner (a)

(b)

(c)

(a)

(b)

(c)

COAXIAL TILT-ROTOR UNMANNED AERIAL VEHICLE AND CONTROL METHOD THEREOF

TECHNICAL FIELD

The present disclosure belongs to the technical field of small-scale unmanned aerial vehicle (UAV), and particularly relates to a coaxial tilt-rotor unmanned aerial vehicle (CTRUAV) and a control method thereof.

BACKGROUND

Tilt-rotor UAV is a hybrid design UAV which integrates a fixed-wing UAV and a helicopter. The tilt-rotor UAV not only has the capability of vertical takeoff and landing (VTOL) and hovering in the air of an ordinary helicopter, but also has the capability of high speed long duration flight of the fixed-wing UAV.

The tilt-rotor UAV is a rotary-wing UAV with a unique performance. A set of tiltable coaxial-rotor module which can rotate between a horizontal position and a vertical position is arranged respectively at two leading edges of the wings of a similar fixed-wing UAV. When the UAV takes off and lands vertically, the rotor shaft is perpendicular to the ground in a vertical flight mode, and can hover in the air, fly forward and backward and fly left and right. After the tilt-rotor UAV takes off and reaches a certain speed, the rotor shaft can be tilted forward at an angle of 90° and is in a horizontal state. The propeller is used as a thrust propeller. At this time, the tilt-rotor UAV can conduct long-duration horizontal flight at a higher speed like the fixed-wing UAV.

Using a new thinking method to design the propeller and overall layout of the helicopter, the designed tilt rotor UAV has broken through the category of traditional helicopters. The tilt-rotor UAV belongs to a hybrid design UAV prototype, and is a breakthrough and leapfrogging in the helicopter technology, a revolutionary high technology in the helicopter industry and also an inevitable result of the development of the helicopter technology. Despite combining the advantages of the fixed-wing UAVs and the helicopters, the tilt-rotor UAV still has many disadvantages:
1. In the tilt transient process from VTOL mode to fixed-wing mode, changing in the dynamical performance will affect the stabilization of the UAV, thereby bringing potential safety hazards for this type of UAV.
2. The existing tilt-rotor UAVs still have the problems of heavy weight and large power consumption, and need to be further improved.
3. Failing at one side of traditional tilt-rotor UAVs will seriously affect the stabilization of the UAV, and the UAV will have a high probability of losing control. The loss of transmission efficiency will be increased after a compensation system is added.

SUMMARY

In view of the above problems, the present disclosure designs a coaxial tilt-rotor unmanned aerial vehicle (CTRUAV). The CTRUAV adopts a layout of three rotor modules and five rotors. The three rotor modules are in an inverted triangle layout. Two pairs of coaxial rotors are respectively installed on the two rotor modules in the front, and a rear rotor is installed on the rear fixed-axis rotor module.

The present disclosure adopts the following technical solution:

The CTRUAV comprises three rotor modules, five rotors with motors respectively and a control system. The three rotor modules are respectively a left coaxial tiltable rotor module and a right coaxial tiltable rotor module located in the front, and a rear fixed-axis rotor shaft located at the rear. The three rotor modules are in an inverted triangle layout. The left and right coaxial tiltable rotor modules in the front of the CTRUAV can rotate around the plane of a fuselage. A rear rotor is installed on the rear fixed-axis rotor module and driven by a motor installed on the rear fixed-axis rotor module. Two pairs of coaxial rotors are installed on the left and right coaxial tiltable rotor modules, respectively, and a pair of coaxial motors drive each pair of coaxial rotors. The two motors of the same pair of coaxial motors have the same rotation speed and opposite rotation directions. Namely, the left and right coaxial tiltable rotor modules consist of an upper rotor and a lower rotor respectively; the upper rotor and the lower rotor have opposite rotation directions and the same rotation speed during the flight. Moreover, in the two pairs of coaxial rotors, the rotors on same layers have opposite rotation directions, and the rotors on different layers have the same rotation directions. The control system is installed on the CTRUAV and used to receive position and attitude information of the CTRUAV, perform the control operation, and then drive the three rotor modules (the rotation speed of the rear rotor module, and the rotation speeds and tilt angles of the left and right coaxial tiltable rotor modules, i.e., totally five degrees of control) to control the motion of the CTRUAV.

The CTRUAV has three modes: The vertical takeoff and landing (VTOL) mode, the fixed-wing mode and the transition mode. The VTOL mode and the fixed-wing mode are switched through the transition mode; then the CTRUAV is in the VTOL mode, the three rotor modules are perpendicular to the plane of the fuselage, and the five rotors provide lift forces to help the CTRUAV to take off or land quickly; when the CTRUAV is in the fixed-wing mode, the left and right coaxial tiltable rotor modules are parallel to the plane of the fuselage to provide horizontal forward thrust forces; and the rear fixed-axis rotor module is perpendicular to the plane of the fuselage to provide the lift force to ensure the smooth forward flight of the CTRUAV.

A forward direction is taken as a positive direction of a X-axis, a takeoff direction is taken as a positive direction of a Z-axis, and a direction perpendicular to the positive direction of the X-axis is taken as a positive direction of a Y-axis, then we can establish a coordinate system. The working process that the UAV rotates around three axes in the VTOL mode is: increasing the rotation speed of one pair of coaxial tiltable rotors in the front will break the balance of torque in the X-axis direction, and then the CTRUAV will roll around the X-axis; changing the rotation speed of the rear rotor can provide a varying torque in the Y-axis direction, and the CTRUAV will pitch around the Y-axis; increasing the rotation speed of one of each pair of coaxial tiltable rotors (these two rotors have opposite rotation directions) will break the balance of torque in the Z-axis direction, and then the CTRUAV will yaw around the Z-axis. The working process that the UAV rotates around the three axes in the fixed-wing mode is: if the left and right rotor module are at proper angles and have proper speed, the torque of the X-axis will be generated (the torques in the other axes are balanced), so that the CTRUAV will roll around the X-axis; if the rear rotor provides a torque in the Y-axis direction, the UAV will pitch around the Y-axis; if the left and right rotor module are at proper angles and have proper speed, the torque of the Z-axis will be generated (the torques in the other axes are balanced), so that the CTRUAV will roll around the Z-axis.

The control method of the above CTRUAV comprises the following steps:

step 1: according to the target and current positing and attitude, obtaining the error between the target and current value, and then getting a set of forces and torques vectors $[F_x\ F_z\ \tau_\Phi\ \tau_\theta\ \tau_\psi]^T$ after operation by the control system (such as a PID controller); wherein $F_x$ is a resultant force of three rotor modules in the x direction; $F_z$ is a resultant force of three rotor modules in the z direction; $\tau\Phi$ is a resultant torque of three rotor modules around the x direction; $\tau_\theta$ is a resultant torque of three rotor modules around the y direction; and $\tau\psi$ is a resultant torque of three rotor modules around the z direction;

step 2: calculating a set of forces $[F_{5z}\ F_{2z}\ F_{2x}\ F_{1z}\ F_{1x}]^T$ which are produced by the left, right and rear rotor modules respectively through the equations (1);

$$\begin{bmatrix} F_x \\ F_z \\ \tau_\phi \\ \tau_\theta \\ \tau_\psi \end{bmatrix} = \begin{bmatrix} 0 & 0 & 1 & 0 & 1 \\ 1 & 1 & 0 & 1 & 0 \\ 0 & -L_1 & 0 & -L_1 & 0 \\ L_3 & L_2 & 0 & -L_2 & 0 \\ 0 & 0 & L_1 & 0 & -L_1 \end{bmatrix} \begin{bmatrix} F_{5z} \\ F_{2z} \\ F_{2x} \\ F_{1z} \\ F_{1x} \end{bmatrix} \quad (1)$$

wherein $F_{5z}$ is the lift force of the fixed-axis rotor module; $F_{2z}$ and $F_{2x}$ are component forces of the right coaxial tiltable rotor module in the z direction and the x direction respectively; $F_{1z}$ and $F_{1x}$ are component forces of the left coaxial tiltable rotor module in the z direction and the x direction respectively; CoG is the center of gravity (CoG) of the CTRUAV; $L_1$ is half of a distance between left and right coaxial tiltable rotor module of the CTRUAV; $L_2$ is a distance from a midpoint of a connecting line between left and right coaxial tiltable rotor module to CoG; and $L_3$ is a distance from the rear rotor module to the CoG;

step 3: calculating the rotation speed of the five motors of each rotor, the tilt angles of the left and right coaxial tiltable rotor module in the front through equations (2); wherein in the equations (2), the force provided by each rotor is proportional to its rotation speed; $k_5$, $k_2$ and $k_1$ are respectively scale factors corresponding to the rear rotor module, the right rotor module and the left rotor module;

$$\begin{cases} F_{5z} = k_5\omega_5^2 \\ \sqrt{F_{2z}^2 + F_{2x}^2} = F_2 = k_2\omega_2^2 \\ \theta_2 = \arctan(F_{2z}/F_{2x}) \\ \sqrt{F_{1z}^2 + F_{1x}^2} = F_1 = k_1\omega_1^2 \\ \theta_1 = \arctan(F_{1z}/F_{1x}) \end{cases} \quad (2)$$

wherein $F_1$ is the force of the left coaxial tiltable rotor module; $\omega_1$ is the rotation speed of the coaxial motors on the left coaxial tiltable rotor module, and $\theta_1$ is the tilt angle of the left coaxial tiltable rotor module; $F_2$ is the force of the right coaxial tiltable rotor module; $\omega_2$ is the rotation speed of the coaxial motors on the right coaxial tiltable rotor module, and $\theta_2$ is the tilt angle of the right coaxial tiltable rotor module; $\omega_5$ is the rotation speed of the motor on the rear rotor module;

step 4: the set of data $\omega_1$, $\theta_1$, $\omega_2$, $\theta_2$ and $\omega_5$ which has already obtained in step 3 can drive the CTRUAV directly so that the rotation speed of the rear rotor module, and the rotation speeds and tilt angles of the left and right coaxial tiltable rotor modules, i.e., changing five control inputs can change the motion state of the CTRUAV to approach the target position and attitude gradually.

The present disclosure has the following beneficial effects:

(1) In the transition mode, the dynamical model of the CTRUAV, such as center of gravity (CoG), rotational inertia, lift force direction, rotor torque direction, and the effect of air flow field on the fuselage and wings, is changed; changing of the dynamical model will not affect the work stability of the CTRUAV proposed by the present disclosure.

(2) In the hovering state with the same thrust, the CTRUAV requires power less than a monoplane helicopter by 5%10%.

(3) The traditional tilt-rotor UAVs will lose control after a tilt-rotor at one side fails. However, the CTRUAV of the present disclosure adopts a coaxial structure, and is still controllable as long as the coaxial rotors at one side do not fail at the same time.

(4) Relative to the layout of the traditional tilt-rotor UAVs, the coaxial rotors of the present disclosure are in a coincident layout so that the CTRUAV structure is more compact so that critical projected area of the rotor modules is reduced; and only two sets of relatively complex coaxial tiltable rotor modules are required.

In the figures: n means rotor-n (n=1, 2, 3, 4, 5).

DETAILED DESCRIPTION

Specific embodiments of the present disclosure are described below in detail in conjunction with the drawings of the description.

Figure 1:
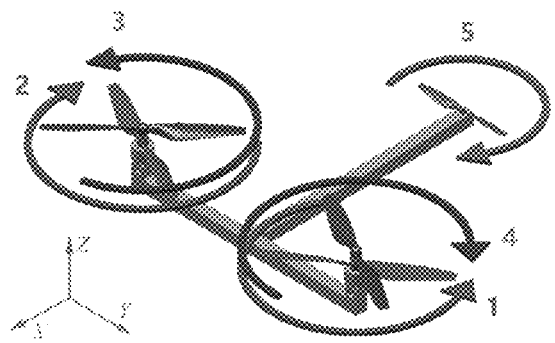
FIG. 1 is a structural diagram of a CTRUAV designed in the present disclosure.

FIG. 1 shows a structural diagram of a CTRUAV with three rotor modules and five rotors designed in the present disclosure. Specifically, a CTRUAV comprises three rotor modules, five rotors with motors respectively and a control system. The three rotor modules are in an inverted triangle layout. The left and right coaxial tiltable rotor modules in the front of the CTRUAV can rotate around the plane of a fuselage. Two pairs of coaxial rotors are respectively installed on the left and right coaxial tiltable rotor modules and each pair of coaxial rotors are driven by a pair of coaxial motors. The two motors of the same pair of coaxial motors have the same rotation speed and opposite rotation directions. As shown in FIG. 1: the rotor-1 and rotor-4 are the coaxial rotors on the left coaxial tiltable rotor module respectively; the rotor-1 is on the lower layer while the rotor-4 is on the upper layer; and the rotor-1 and the rotor-4 have opposite rotation directions; the rotor-2 and rotor-3 are the coaxial rotors on the right coaxial tiltable rotor module respectively; the rotor-2 is on the lower layer while the rotor-3 is on the upper layer; and the rotor-2 and the rotor-3 have opposite rotation directions; besides, the rotors on the same layer have opposite rotation directions but the rotors on different layers have the same rotation direction, which means the rotor-1 and the rotor-3 have the same rotation direction, while the rotor-2 and the rotor-4 have the same rotation direction witch is opposite to the rotor-1 and rotor-3; moreover, a rear rotor is installed on the rear fixed-axis rotor module and driven by a motor installed on the rear fixed-axis rotor module, as shown by the rotor-5 in FIG. 1.

Figure 2:
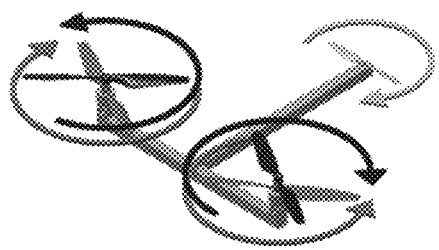
FIG. 2 shows schematic diagrams of three modes of a CTRUAV of the present disclosure, wherein (a) is a schematic diagram of a VTOL mode, (b) is a schematic diagram of a fixed-wing mode and (c) is a schematic diagram of a transition mode.
Figure 2:
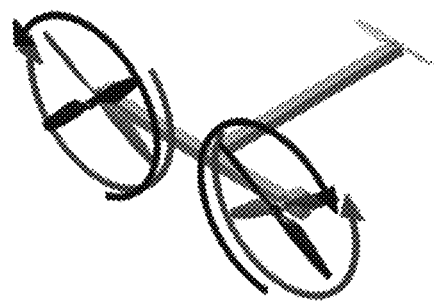
Figure 2:
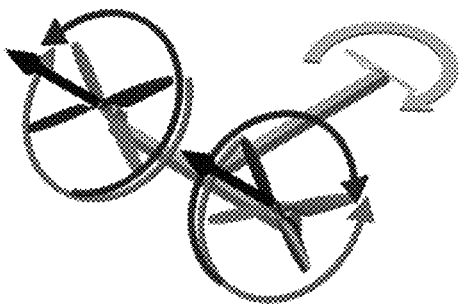

As shown in FIG. 2, the CTRUAV of the present disclosure has three modes, which are respectively the VTOL mode, the fixed-wing mode and the transition mode. As shown in FIG. 2(a), when the CTRUAV is in the VTOL mode, the three rotor modules are perpendicular to the plane of the fuselage, and the five rotors provide lift force to help the CTRUAV to take off or land quickly. As shown in FIG. 2(b), when the CTRUAV is in the fixed-wing mode, the rear rotor module provides lift force or stops working, and the left and right coaxial tiltable rotor module are parallel to the plane of the fuselage to provide horizontal forward and lift force to ensure the CTRUAV to fly forward smoothly. As shown in FIG. 2(c), the VTOL mode and the fixed-wing mode are switched through the transition mode.

Figure 3:
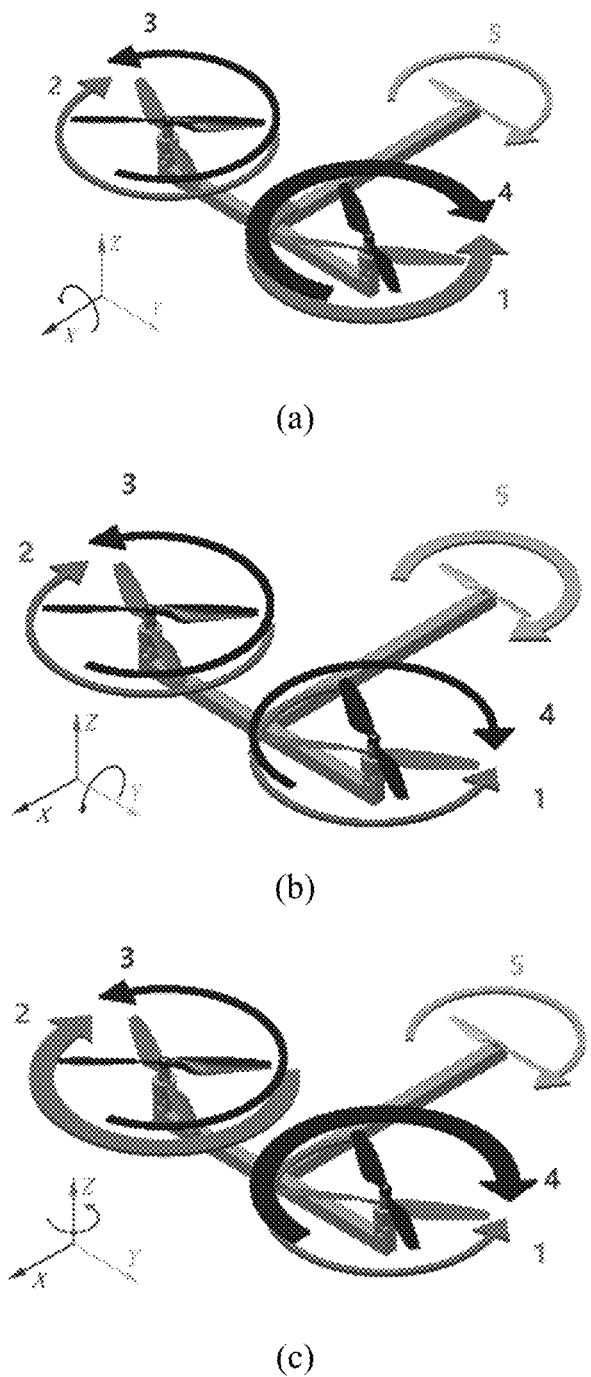
FIG. 3 shows working schematic diagrams of a CTRUAV which rotates around three axes in the VTOL mode, wherein (a) is a working schematic diagram of roll around an X-axis, (b) is a working schematic diagram of pitch around a Y-axis, and (c) is working schematic diagram of yaw around a Z-axis.

FIG. 3 shows working schematic diagrams of the CTRUAV which rotates around three axes in the VTOL mode. If the rotation speed of a pair of coaxial tiltable rotors on the same front rotor module is increased, the balance of torque in the X-axis direction will be broken so that the CTRUAV will roll around the X-axis (Shown in FIG. 3(a)). If the rear rotor provides a torque in the Y-axis direction, the CTRUAV will pitch around the Y-axis (Shown in FIG. 3(b)). If the rotation speed of one of each pair of coaxial tiltable rotors (these two rotors have opposite rotation directions) is increased, the balance of torque in the Z-axis direction will be broken so that the CTRUAV will yaw around the Z-axis (Shown in FIG. 3(c)).

Figure 4:
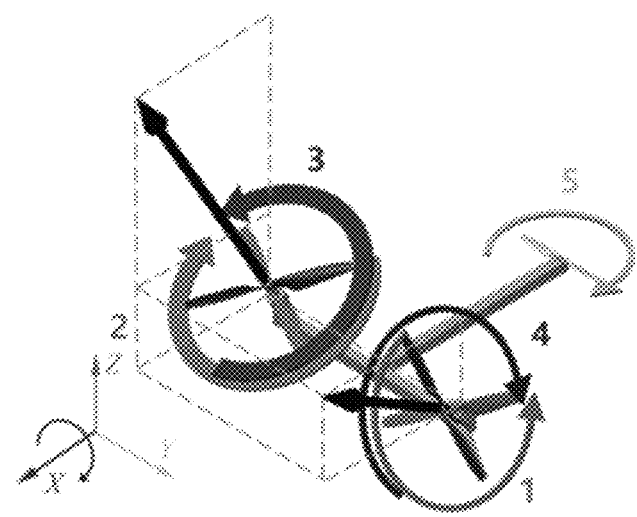
FIG. 4 shows working schematic diagrams of a CTRUAV which rotates around three axes in the fixed-wing mode, wherein (a) is a working schematic diagram of roll around an X-axis, (b) is a working schematic diagram of pitch around a Y-axis, and (c) is working schematic diagram of yaw around a Z-axis.
Figure 4:
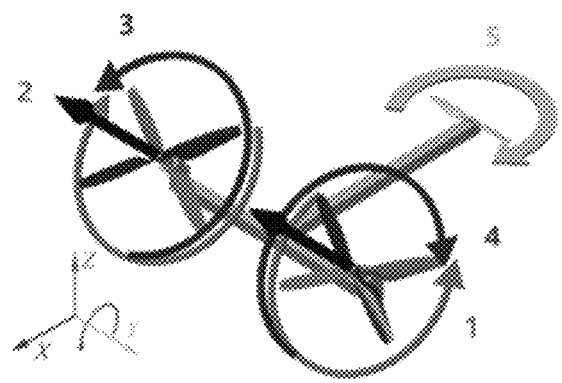
Figure 4:
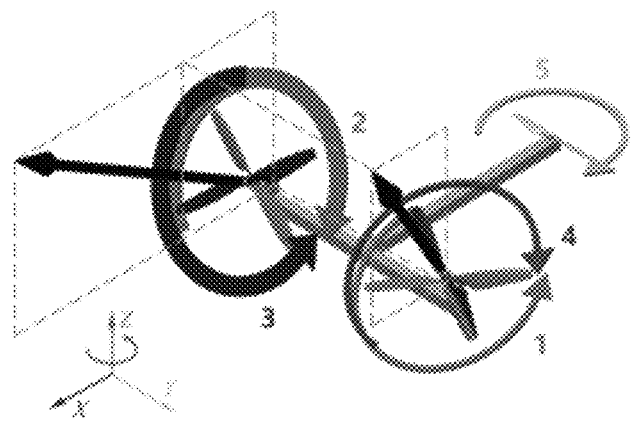

FIG. 4 shows the working schematic diagram of the CTRUAV which rotates around three axes in the fixed-wing mode. If the left and right rotor module are at proper angles and have proper speed, the torque of the X-axis will be generated (the torques in the other axes are balanced), so that the CTRUAV will roll around the X-axis (Shown in FIG. 3(a)). If the rear rotor provides a torque in the Y-axis direction, the UAV will pitch around the Y-axis (Shown in FIG. 3(b)). If the left and right rotor module are at proper angles and have proper speed, the torque of the Z-axis will be generated (the torques in the other axes are balanced), so that the CTRUAV will roll around the Z-axis (Shown in FIG. 3(c)).

Figure 5:
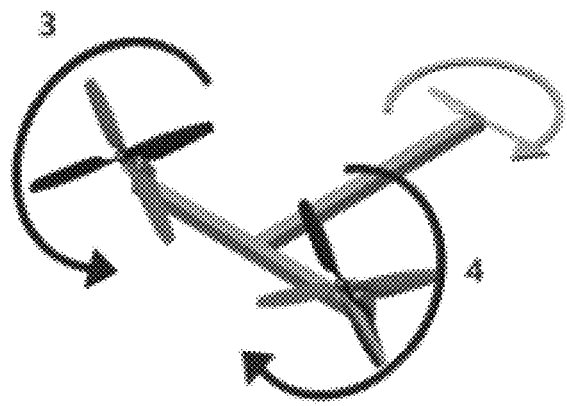
FIG. 5 is a working schematic diagram of a CTRUAV of the present disclosure when one of the left coaxial tiltable rotors or one of the right coaxial tiltable rotors is out of gear.

FIG. 5 is a working schematic diagram of the CTRUAV of the present disclosure when one of the left coaxial tiltable rotors or one of the right coaxial tiltable rotors fails. At this time, the rotor which has the same rotation direction as the failing rotor in the other side is made to stop operating, and then the CTRUAV is operated in the three-rotor mode and still controllable. Only when a pair of coaxial tiltable rotors on the same side fails, the CTRUAV enters an uncontrollable state.

Figure 6:
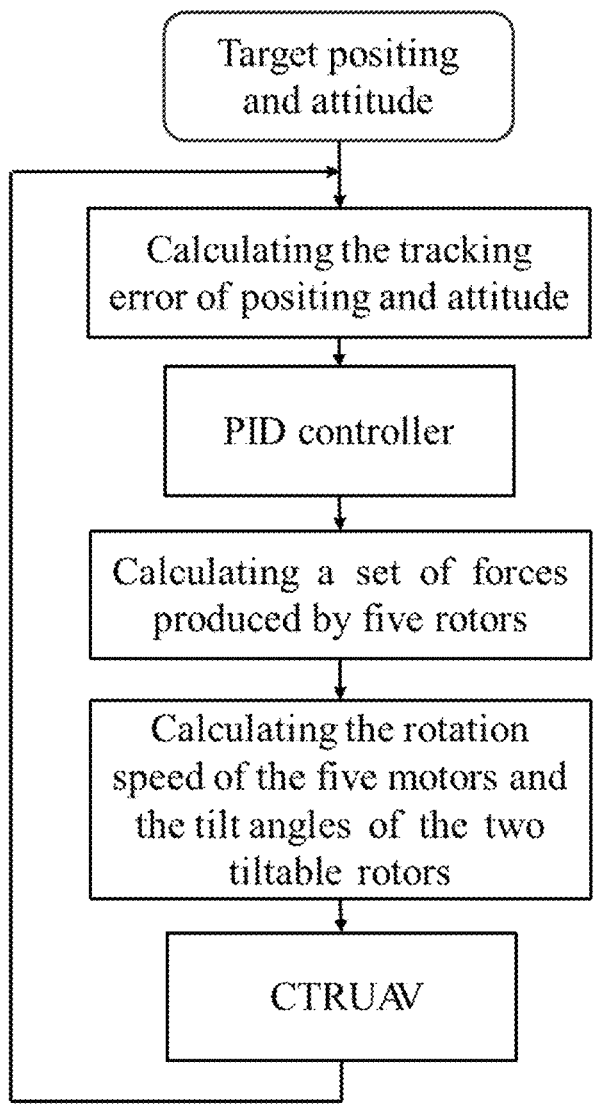
FIG. 6 is a flow chart of a control method of a CTRUAV of the present disclosure.
Figure 7:
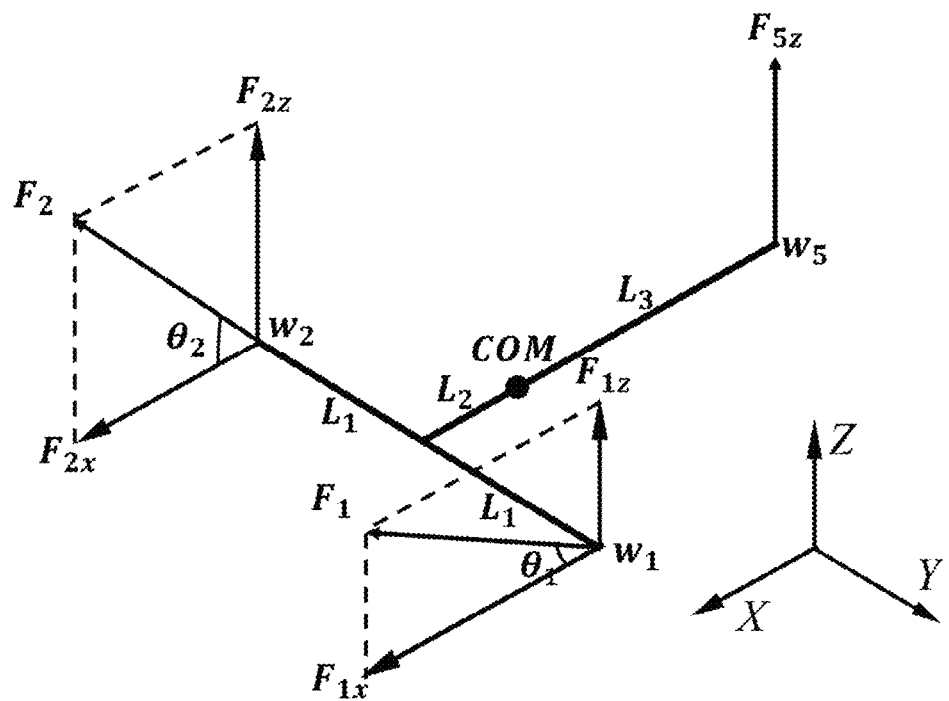
FIG. 7 is a schematic diagram of a control method of a CTRUAV of the present disclosure.

FIG. 6 is a flow chart of a control method of the present disclosure. In each sampling period, the CTRUAV is driven through the following steps:

step 1: according to the target and current positing and attitude, obtaining the error between the target and current value, and then getting a set of forces and torques vectors $[F_x \ F_z \ \tau_\phi \ \tau_\theta \ \tau_\psi]^T$ after operation by the control system (such as a PID controller in FIG. 6); wherein $F_x$ is a resultant force of three rotor modules in the x direction; $F_z$ is a resultant force of three rotor modules in the z direction; $\tau_\phi$ is a resultant torque of three rotor modules around the x direction; $\tau_\theta$ is a resultant torque of three rotor modules around the y direction; and $\tau_\psi$ is a resultant torque of three rotor modules around the z direction;

step 2: calculating a set of forces $[F_{5z} \ F_{2z} \ F_{2x} \ F_{1z} \ F_{1x}]^T$ which are produced by the left, right and rear rotor modules respectively as shown in FIG. 7. Then, the relationship between the $[F_x \ F_z \ \tau_\phi \ \tau_\theta \ \tau_\psi]^T$ and $[F_{5z} \ F_{2z} \ F_{2x} \ F_{1z} \ F_{1x}]^T$ can be expressed as the equations (1);

$$\begin{bmatrix} F_x \\ F_z \\ \tau_\phi \\ \tau_\theta \\ \tau_\psi \end{bmatrix} = \begin{bmatrix} 0 & 0 & 1 & 0 & 1 \\ 1 & 1 & 0 & 1 & 0 \\ 0 & -L_1 & 0 & -L_1 & 0 \\ L_3 & L_2 & 0 & -L_2 & 0 \\ 0 & 0 & L_1 & 0 & -L_1 \end{bmatrix} \begin{bmatrix} F_{5z} \\ F_{2z} \\ F_{2x} \\ F_{1z} \\ F_{1x} \end{bmatrix} \quad (1)$$

wherein $F_{5z}$ is the lift force of the fixed-axis rotor module; $F_{2z}$ and $F_{2x}$ are component forces of the right coaxial tiltable rotor module in the z direction and the x direction respectively; $F_{1z}$ and $F_{1x}$ are component forces of the left coaxial tiltable rotor module in the z direction and the x direction respectively; CoG is the center of gravity (CoG) of the CTRUAV; $L_1$ is half of a distance between left and right coaxial tiltable rotor module of the CTRUAV; $L_2$ is a distance from a midpoint of a connecting line between left and right coaxial tiltable rotor module to CoG; and $L_3$ is a distance from the rear rotor module to the CoG;

step 3: calculating the rotation speed of the five motors of each rotor, the tilt angles of the left and right coaxial tiltable rotor module in the front through equations (2); wherein in the equations (2), the force provided by each rotor is proportional to its rotation speed; $k_5$, $k_2$ and $k_1$ are respectively scale factors corresponding to the rear rotor module, the right rotor module and the left rotor module;

$$\begin{cases} F_{5z} = k_5 \omega_5^2 \\ \sqrt{F_{2z}^2 + F_{2x}^2} = F_2 = k_2 \omega_2^2 \\ \theta_2 = \arctan(F_{2z}/F_{2x}) \\ \sqrt{F_{1z}^2 + F_{1x}^2} = F_1 = k_1 \omega_1^2 \\ \theta_1 = \arctan(F_{1z}/F_{1x}) \end{cases} \quad (2)$$

wherein $F_1$ is the force of the left coaxial tiltable rotor module; $\omega_1$ is the rotation speed of the coaxial motors on the left coaxial tiltable rotor module, and $\theta_1$ is the tilt angle of the left coaxial tiltable rotor module; $F_2$ is the force of the right coaxial tiltable rotor module; $\omega_2$ is the rotation speed of the coaxial motors on the right coaxial tiltable rotor module, and $\theta_2$ is the tilt angle of the right coaxial tiltable rotor module; $\omega_5$ is the rotation speed of the motor on the rear rotor module;

step 4: the set of data $\omega_1$, $\theta_1$, $\omega_2$, $\theta_2$ and $\omega_5$ which has already obtained in step 3 can drive the CTRUAV directly so that the rotation speed of the rear rotor module, and the rotation speeds and tilt angles of the left and right coaxial tiltable rotor modules, i.e., totally five degrees of control are changed so as to change the motion state of the CTRUAV to approach the target position and attitude gradually.

Figure 8:
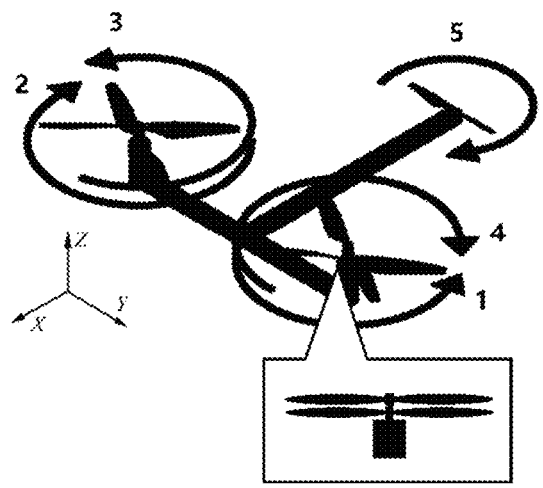
FIG. 8 is a schematic diagram of coaxial motors installed on left and right coaxial tiltable rotor modules of the present disclosure.

FIG. 8 is a schematic diagram of coaxial motors installed on the left and right coaxial tiltable rotor modules of the present disclosure. Two pairs of coaxial motors are respectively installed on the left and right coaxial tiltable rotor modules of the CTRUAV. Two motors on the same rotor module are always keep the opposite rotation directions.

The invention claimed is:

1. A coaxial tilt-rotor unmanned aerial vehicle (CTRUAV), comprising:
   three rotor modules positioned in an inverted triangle layout, the three to rotor modules comprising:
      a left coaxial tiltable rotor module;
      right coaxial tiltable rotor module located at a front of the CTRUAV; and
      a fixed-axis rear rotor module located at a rear of the CTRUAV;
   five rotors with motors, comprising:
      a rear rotor installed on the rear fixed-axis rotor module and driven by a motor installed on the rear fixed-axis rotor module; and
      two pairs of coaxial rotors respectively installed on the left coaxial tiltable rotor module and the right coaxial tiltable rotor module, each pair of coaxial rotors being driven by a pair of coaxial motors; and
   a control system installed on the CTRUAV and used to receive position and attitude information of the CTRUAV, perform control operation, and drive the three rotor modules to control the motion of the CTRUAV,
   wherein the left coaxial tiltable rotor module and the right coaxial tiltable rotor module are configured to rotate around a plane of a fuselage;
   wherein the two motors of a pair of coaxial motors have a same rotation speed and opposite rotation directions,
   wherein in the two pairs of coaxial rotors, rotors on same layers have opposite rotation directions, and rotors on different layers have the same rotation directions,
   wherein the CTRUAV can roll around an X-axis, pitch around a Y-axis and yaw around a Z-axis, wherein, taking a positive direction of the X-axis as a forward direction; taking the positive direction of the Z-axis as a takeoff direction, and taking the positive direction of the Y-axis as a direction perpendicular to the positive direction of the X-axis,
   wherein the CTRUAV has three modes comprising:
      a vertical takeoff and landing (VTOL) mode;
      a fixed-wing mode; and
      a transition mode,
   wherein the VTOL mode and the fixed-wing mode are switched through the transition mode,
   wherein, when the CTRUAV is in the VTOL mode, the CTRUAV places the three rotor modules perpendicular to the plane of the fuselage, and uses the five rotors to provide lift forces to take off or land quickly, and
   wherein, when the CTRUAV is in the fixed-wing mode, the CTRUAV tilts the left and right coaxial tiltable rotor modules parallel to the plane of the fuselage to provide horizontal forward thrust forces, and places the rear fixed-axis rotor module perpendicular to the plane of the fuselage to provide the lift force to ensure the smooth forward flight.

2. A control method of the coaxial tilt-rotor unmanned aerial vehicle (CTRUAV) of claim 1, comprising steps of:
   step 1: according to target and current positing and attitude, obtaining error between the target and current value, and then getting a set of forces and torques vectors $[F_x \ F_z \ \tau_\phi \ \tau_\theta \ \tau_\psi]^T$ after operation by the control system; wherein $F_x$ is a resultant force of three rotor modules in the x direction; $F_z$ is a resultant force of three rotor modules in the z direction; $\tau_\phi$ is a resultant torque of three rotor modules around the x direction; $\tau_\theta$ is a resultant torque of three rotor modules around the y direction; and $\tau_\psi$ a resultant torque of three rotor modules around the z direction;
   step 2: calculating a set of forces $[F_{5z} \ F_{2z} \ F_{2x} \ F_{1z} \ F_{1x}]^T$ which are produced by the left, right and rear rotor modules respectively through the equations (1);

$$\begin{bmatrix} F_x \\ F_z \\ \tau_\phi \\ \tau_\theta \\ \tau_\psi \end{bmatrix} = \begin{bmatrix} 0 & 0 & 1 & 0 & 1 \\ 1 & 1 & 0 & 1 & 0 \\ 0 & -L_1 & 0 & -L_1 & 0 \\ L_3 & L_2 & 0 & -L_2 & 0 \\ 0 & 0 & L_1 & 0 & -L_1 \end{bmatrix} \begin{bmatrix} F_{5z} \\ F_{2z} \\ F_{2x} \\ F_{1z} \\ F_{1x} \end{bmatrix} \quad (1)$$

wherein $F_{5z}$ is lift force of the fixed-axis rotor module; $F_{2z}$ and $F_{2x}$ are component forces of the right coaxial tiltable rotor module in the z direction and the x direction respectively; $F_{1z}$ and $F_{1x}$ are component forces of the left coaxial tiltable rotor module in the z direction and the x direction respectively; CoG is center of gravity (CoG) of the CTRUAV; $L_1$ is half of a distance between left and right coaxial tiltable rotor module of the CTRUAV; $L_2$ is a distance from a midpoint of a connecting line between left and right coaxial tiltable rotor module to CoG; and $L_3$ is a distance from the rear rotor module to the CoG;

step 3: calculating the rotation speed of the five motors of each rotor, tilt angles of the left and right coaxial tiltable rotor module in the front through equations (2); wherein in the equations (2), the force provided by each rotor is proportional to its rotation speed; $k_5$, $k_2$ $k_1$ are respectively scale factors corresponding to the rear rotor module, the right rotor module and the left rotor module;

$$\begin{cases} F_{5z} = k_5\omega_5^2 \\ \sqrt{F_{2z}^2 + F_{2x}^2} = F_2 = k_2\omega_2^2 \\ \theta_2 = \arctan(F_{2z}/F_{2x}) \\ \sqrt{F_{1z}^2 + F_{1x}^2} = F_1 = k_1\omega_1^2 \\ \theta_1 = \arctan(F_{1z}/F_{1x}) \end{cases} \quad (2)$$

wherein $F_1$ is the force of the left coaxial tiltable rotor module; $\omega_1$ is the rotation speed of the coaxial motors on the left coaxial tiltable rotor module, and $\theta_1$ is the tilt angle of the left coaxial tiltable rotor module; $F_2$ is the force of the right coaxial tiltable rotor module; $\omega_2$ is the rotation speed of the coaxial motors on the right coaxial tiltable rotor module, and $\theta_2$ is the tilt angle of the right coaxial tiltable rotor module; $\omega_5$ is the rotation speed of the motor on the rear rotor module;

step 4: the set of data $\omega_1$, $\theta_1$, $\omega_2$, $\theta_2$, and $\omega_5$ which has already obtained in step 3 can drive the CTRUAV directly so that the rotation speed of the rear rotor module, and the rotation speeds and tilt angles of the left and right coaxial tiltable rotor modules, i.e., changing five control inputs can change the motion state of the CTRUAV to approach the target position and attitude gradually.

\* \* \* \* \*